United States Patent

Benjamin

Patent Number: 5,310,297
Date of Patent: May 10, 1994

[54] CARGO RESTRAINT APPARATUS AND SYSTEM

[75] Inventor: Arthur J. Benjamin, Germantown, Tenn.

[73] Assignee: Federal Express Corporation, Memphis, Tenn.

[21] Appl. No.: 935,254

[22] Filed: Aug. 27, 1992

[51] Int. Cl.⁵ .............................................. B60P 1/00
[52] U.S. Cl. .................................. 410/77; 410/69; 244/118.1
[58] Field of Search ................. 410/77, 78, 94, 79, 410/80, 81, 84, 85, 121, 95, 69; 244/118.1, 118.2, 127, 137.1

[56] References Cited

U.S. PATENT DOCUMENTS

| | | | |
|---|---|---|---|
| 3,210,038 | 10/1965 | Bader et al. | 410/77 |
| 3,906,876 | 9/1975 | Alberti | 244/137.1 |
| 3,995,562 | 12/1976 | Nordstrom . | |
| 4,144,821 | 3/1979 | Lang . | |
| 4,234,278 | 11/1980 | Harshman et al. | 244/118.1 |
| 4,349,302 | 9/1982 | Ferguson, Jr. . | |
| 4,557,648 | 12/1985 | Koch et al. . | |
| 4,583,896 | 4/1986 | Vogg et al. | 244/118.1 |
| 4,695,211 | 9/1987 | Van Iperen et al. | 410/77 |
| 5,090,763 | 2/1992 | Kremer et al. | 410/121 |
| 5,112,173 | 5/1992 | Eilenstein et al. | 410/77 |

FOREIGN PATENT DOCUMENTS

| | | | |
|---|---|---|---|
| 0105675 | 4/1984 | European Pat. Off. | 244/118.1 |
| 2432245 | 1/1976 | Fed. Rep. of Germany | 410/79 |

Primary Examiner—Mark T. Le
Attorney, Agent, or Firm—Finnegan, Henderson, Farabow, Garrett & Dunner

[57] ABSTRACT

A cargo restraint system for holding down a cargo pallet, container or Unit Load Device ("ULD") to a cargo floor which has several cargo restraint units that can be attached to the cargo floor. Each cargo restraint unit has a pawl member which can be extended from a substantially horizontal position to a substantially vertical position. In the vertical position, the pawl member restrains the horizontal movement of the cargo pallet, container or ULD placed next to the pawl member. An elongated locking bar engages several of the pawl members to restrict the vertical motion of the cargo pallet, container or ULD placed adjacent to the pawl members.

15 Claims, 7 Drawing Sheets

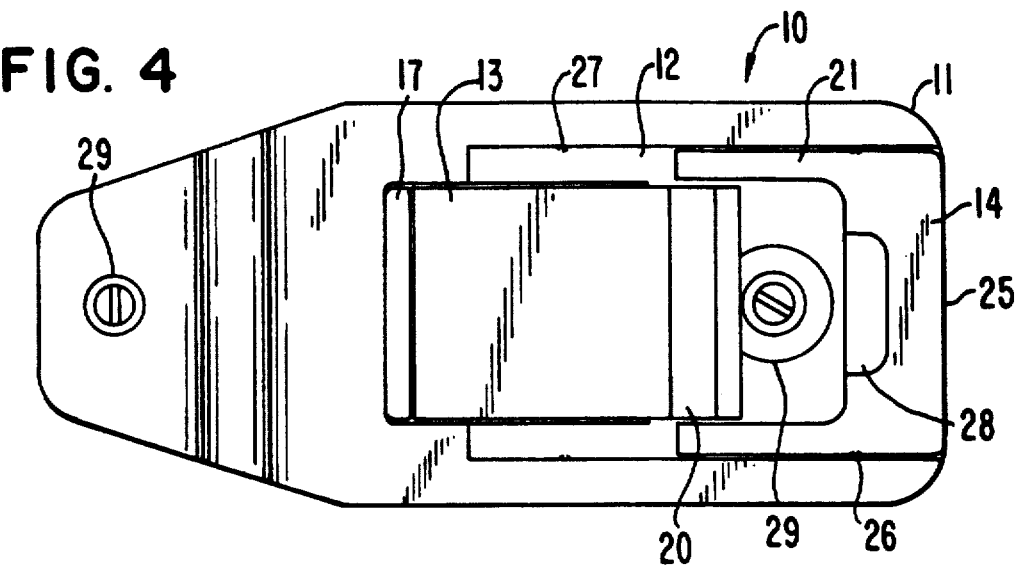
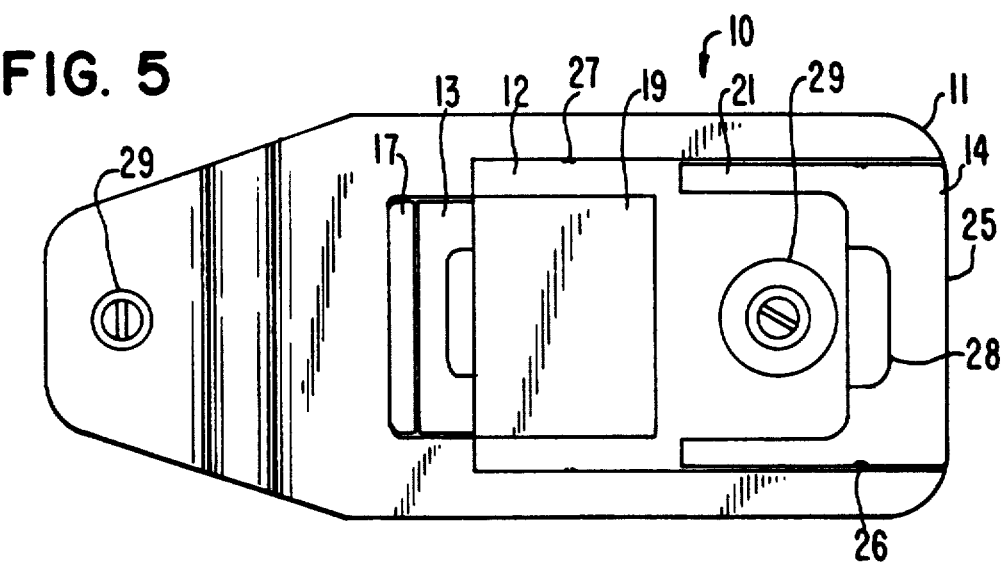
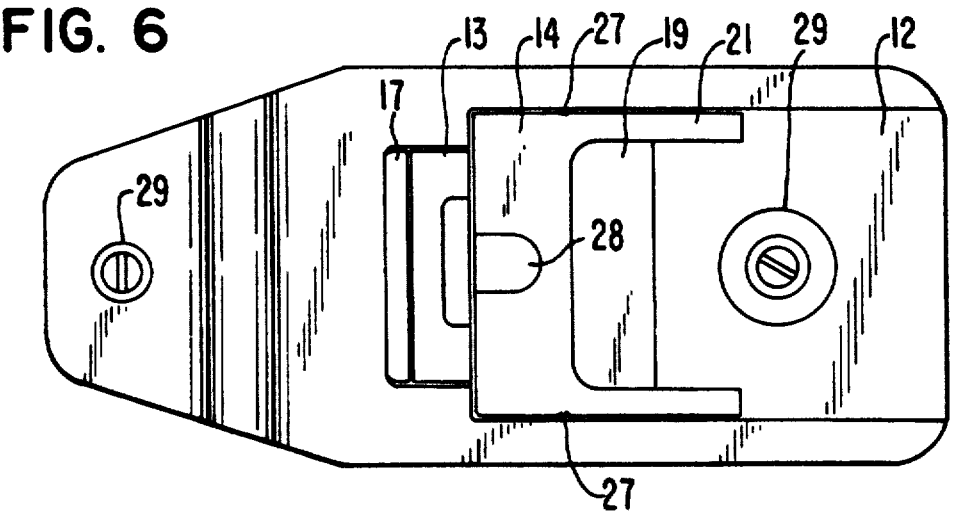

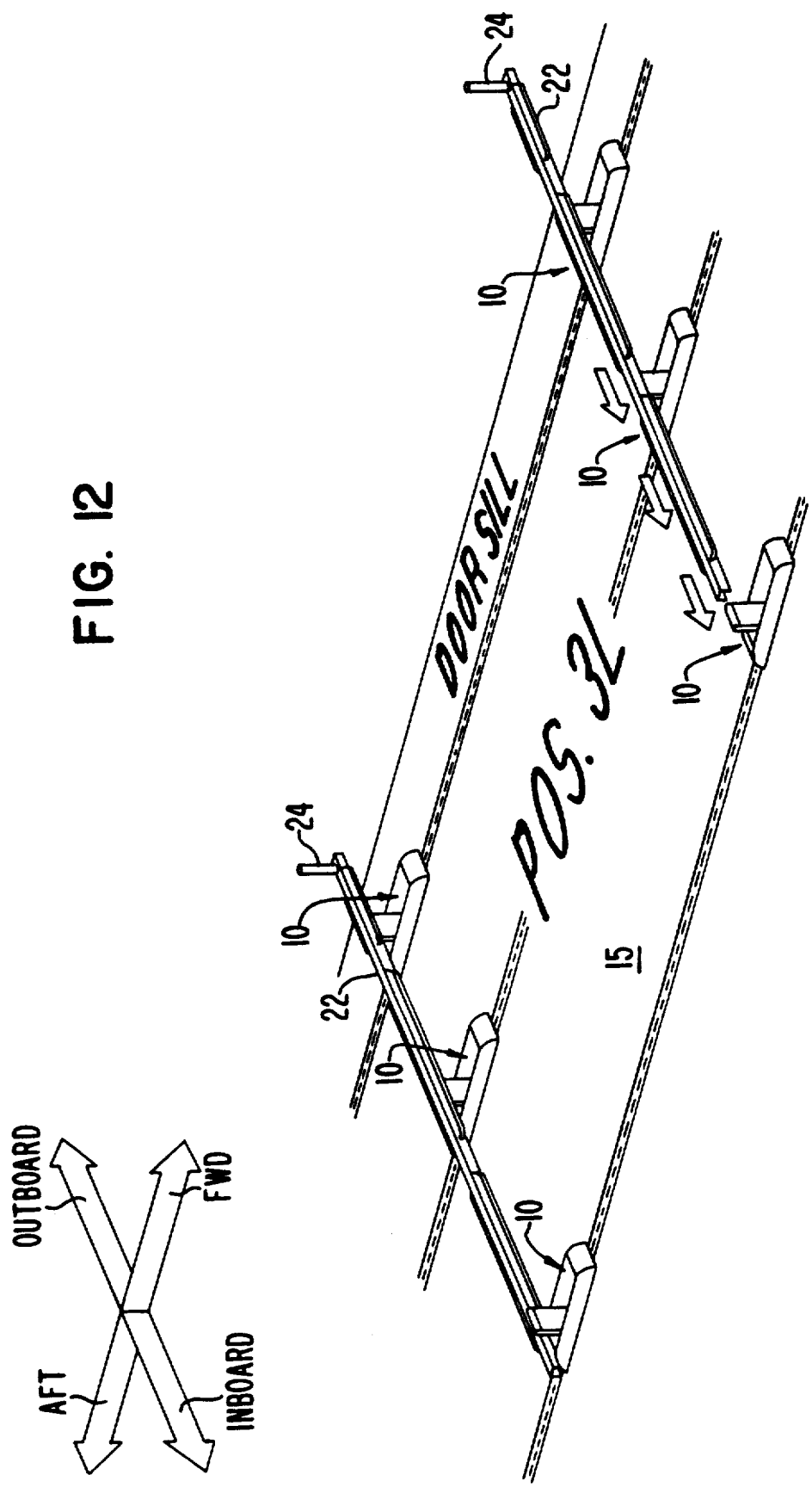

CARGO RESTRAINT APPARATUS AND SYSTEM

FIELD OF THE INVENTION

The present invention relates to an apparatus for restraining the movement of cargo during transportation. More specifically, the present invention relates to an apparatus for restraining cargo containers and pallets placed within a freighter aircraft such as Boeing 727 or the like.

BACKGROUND OF THE INVENTION

Modern aircraft are normally operated to accommodate passengers, cargo, or a combination of the two. In either case, the goal is to generate maximum revenues for each flight. In the case where the aircraft is fitted for passengers, this may be accomplished by adding extra seats. For cargo transportation, clearly the goal is to accommodate the largest volume of parcels and freight possible given the total volume available in the aircraft fuselage.

Most commonly, cargo is loaded into a freighter aircraft either in cargo containers or secured to cargo pallets. To accommodate and secure these containers or pallets in flight, freighter air craft are fitted with ball mats, floor rollers, and floor restraints occasionally referred to as "locks." The locks are secured to seat tracks at specific locations on the cargo floor. The seat tracks are essentially grooves to which passenger seats are typically secured. The locks are positioned on the cargo floor so as to provide fore, aft and vertical restraint for the cargo containers or pallets.

The locks or restraints which are currently used have retractable spring-loaded bear trap-type pawls which, when erected, engage the edges of the containers or pallets. When retracted, the restraints lie below the transport plane. The transport plane is defined as a horizontal plane coincident with the lower surface of the container or pallet when in full contact with the cargo rollers or ball units. For loading and unloading purposes, retracted restraints must lie below the transport plane to permit free movement of the Unit Load Devices ("ULD's", i.e., cargo containers and pallets) within the fuselage main deck cargo area.

Typically, when loading or unloading a freighter aircraft, the first or most forward ULD is initially moved forward (or toward the front of the aircraft) of the in-flight position to fixed stops called rollout stops. The first ULD is moved to the rollout stops to provide sufficient room for personnel to erect or retract the restraint pawls.

In recent years, a modification was made by operators to the cargo systems of many narrow-body freighter aircraft, such as the Boeing-727 and the Douglas DC-8. This modification added a half size ULD in front of the normal main deck ULD complement. Some operators termed this as the "ICU" modification which stands for "Increased Cube Utilization" (i.e., more cubic feet available). This modification was desirable to increase revenue payloads because for those flights with lower density cargo, the aircraft might become volume limited ("cubed out") before it approached the established maximum gross weight limit for operation ("grossed out").

While the payload volume was increased by this modification, an unfortunate side effect occurred which generated loading and unloading difficulties. It was no longer possible to move the first ULD forward toward the original rollout stops to generate gaps between the ULDs. The additional half size ULD used up the space which was previously available. That space had been useful to permit separating the other ULD's sufficiently to erect and retract their mutually shared floor restraints. But after the addition of the ICU module, the new configuration required that the restraint pawls be erected to engage each ULD as it was loaded into position. As always, the last ULD loaded (and the first to be unloaded) had to be positioned on the ballmat in the doorway area adjacent to the main cargo door. However, now in addition, the fore and aft floor restraint pawls had to be erected before loading this final ULD into position. Otherwise, the final ULD would sit on top of the cargo restraint pawls before they had been erected an locking would be impossible. Threading this ULD into position under the erected restraint pawls and unloading the ULD from this position has proven to be a frequently difficult and time-consuming task and is the reason for the development of the cargo hardware described herein.

The problem which has developed concerns the cargo position commonly referred to as 3-Left or 3L position. As mentioned, the 3L cargo position is immediately adjacent to the main cargo door on the upper deck, and it is the last position in which cargo is secured prior to flight. It is also the first position unloaded from the aircraft. The difficulty with the 3L position arises because the 3L position must be loaded with the conventional restraint pawls erected. The reason that the pawls are erected is that they must hold the cargo containers in place on either side, fore and aft, of the 3L position.

In order to place the cargo module in or remove the container from the 3L position, the cargo container must be "threaded" under the erected pawls from a mechanical loader or cargo handler from outside the cargo hold. Since the aircraft sits on landing gear with compressible air-oil shock struts, as the aircraft is loaded and unloaded, the center of gravity shifts and both the deck height and angle may change. Mechanical loaders are capable of compensating for height changes, but few can accommodate deck angle changes. Once a deck angle difference has been created between the aircraft and the loader, the container impacts the erected pawls and may become wedged in place. This problem is especially acute when the cargo container is half in the aircraft and half on the loader. The end result is that it can take as long to load or unload the 3L position as it does to load or unload the remainder of the aircraft.

DESCRIPTION OF THE INVENTION

As a result, it is an object of the present invention to provide an improved cargo restraint system which facilitates loading and unloading cargo in the 3L position.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects, and in accordance with the purpose of the invention, as embodied and broadly described herein, the present invention comprises a cargo restraint system for securedly holding a cargo pallet or container on a cargo floor. The system includes a plurality of cargo restraint units attachable to the cargo floor, each cargo restraint unit having a pawl member which can be extended from a substantially flat first position to a substantially upright second position at which the pawl member can restrain the horizontal movement and yet permit relative vertical movement of the cargo pallet or container placed adjacent the pawl member, and at least one elongated locking bar slidably engageable with a predetermined number of extended pawl members in such a manner as to restrict relative vertical motion between the pawl members and the locking bar, the locking bar containing a surface for restraining the vertical movement of the cargo pallet or container when the cargo pallet or container is positioned adjacent the pawl members.

To further achieve the objects, and in accordance with the objects of the present invention, as embodied and claimed herein, the invention comprises a cargo restraint system for the 3-Left cargo position on a Boeing-727 aircraft including a plurality of cargo restraint units each having an erectable pawl member, and at least one locking bar slidably engageable with a predetermined number of pawl member units and connecting together the predetermined number of cargo restraint units for restraining cargo placed adjacent thereto.

To still further achieve the objects, and in accordance with the objects of the present invention, as embodied and claimed herein, the invention comprises an apparatus for restraining cargo including a housing having a base and a plurality of side members extending vertically therefrom, a pawl member, having first and second sides, pivotally engaging the housing between two of the plurality of side members and movable about a pivotal axis from a horizontal position to a substantially upright position, a first restraining member disposed adjacent to the pawl member and parallel with the pivotal axis for supporting the pawl member in the upright position at the first side of the pawl member, and a second restraining member pivotally engaging the housing between two of the plurality of side members for selectively supporting the pawl member in the upright position at the second side of the pawl member.

The cargo restraint of the present invention facilitates installation and removal of cargo containers. Even if the container should ride up onto the erected pawl, it can easily be moved into its proper position. As a result, the apparatus of the present invention is far more tolerant of deck angle changes than the currently used design. It is also more tolerant of warped or damaged container bases.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 4 is a top view illustration of a cargo restraint unit of the present invention with the pawl member in its substantially flat first position;

FIG. 5 is a top view illustration of a cargo restraint unit of the present invention with the pawl member in the substantially vertical second position;

FIG. 6 is a top view of a cargo restraint unit with the second restraining member in the second substantially flat locking position for supporting the pawl member in its substantially vertical second position;

FIG. 12 is an isometric illustration of the cargo restraint system of the present invention, showing the placement of the locking bars onto the pawl members.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
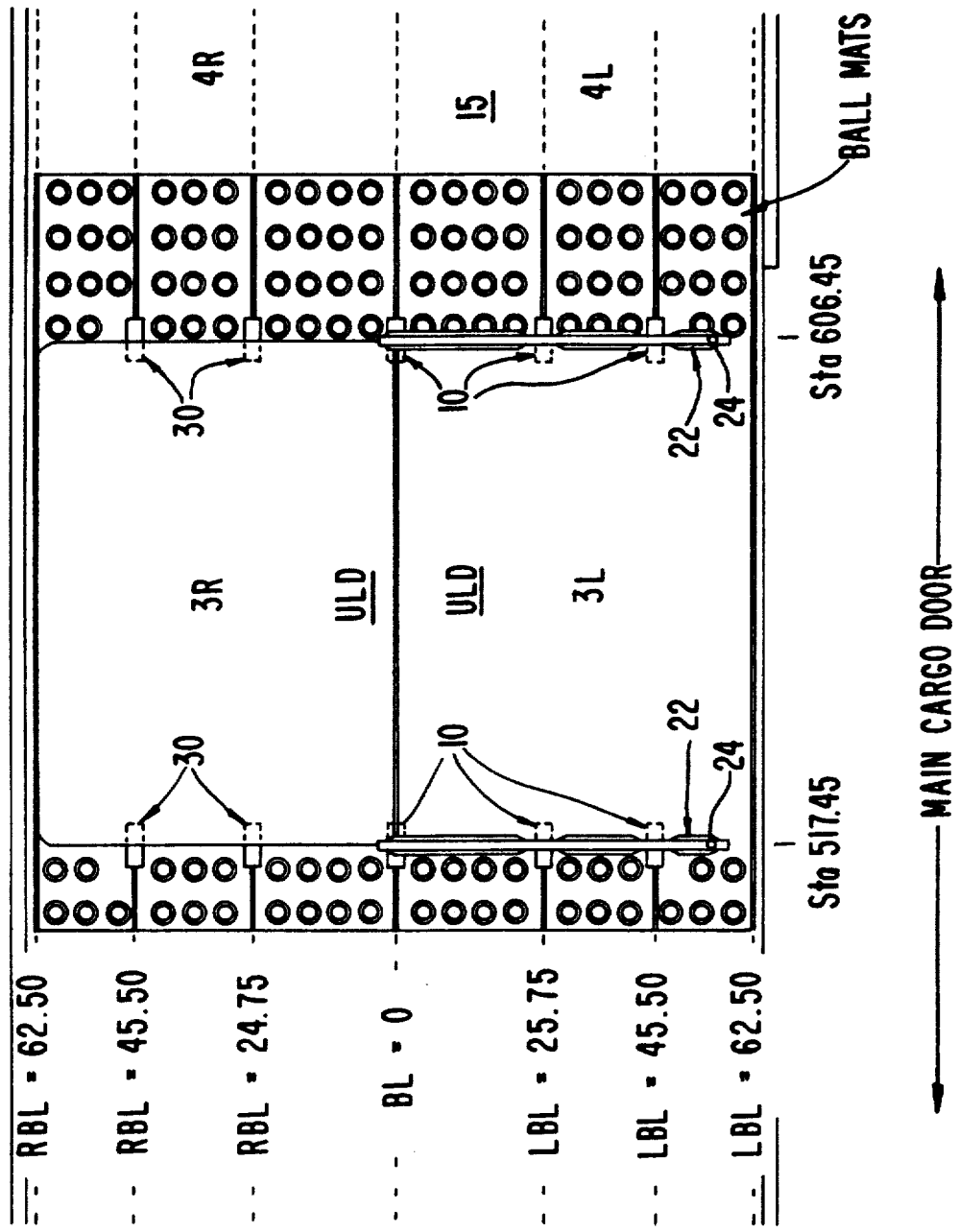
FIG. 1 is a top view illustration of the cargo restraint system of the present invention showing the cargo restraint units connected by the locking bars in the 3-Left cargo position.
Figure 7:
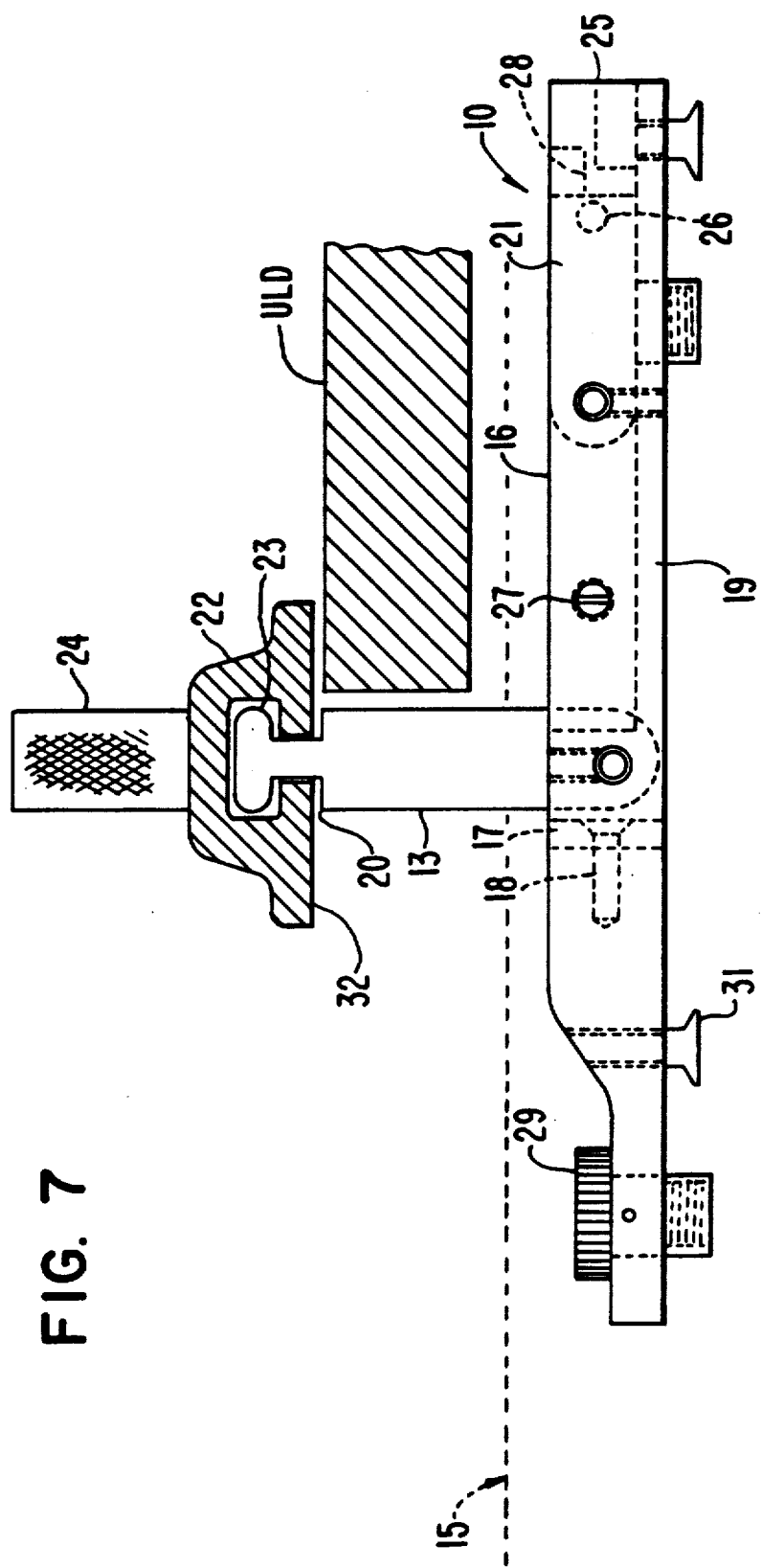
FIG. 7 is a side view illustration showing an erected pawl member with the attendant locking bar and with the second restraining member in an unlocked position.

Referring generally to FIGS. 1 and 7, the cargo restraint system of the present invention is designed to hold a ULD (i.e., a cargo pallet or container (shown generally as "ULD")) on the cargo floor 15 of an aircraft. As is known, such cargo floors 15 include a plurality of tracks 33. These tracks 33 are essentially grooves to which passenger seats or conventional cargo restraints 30 are secured.

Figure 8:
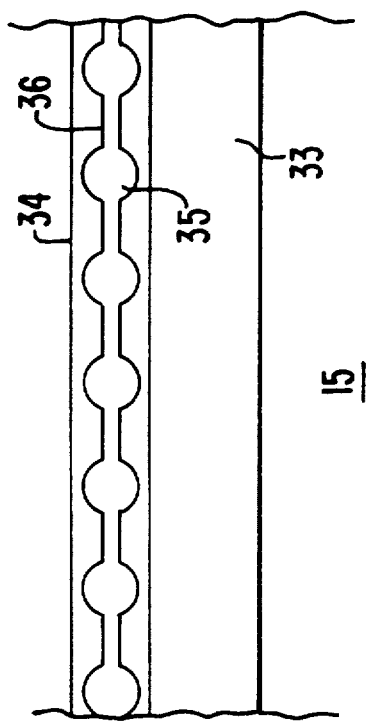
FIG. 8 is a top view of a single track within the cargo floor.
Figure 9:
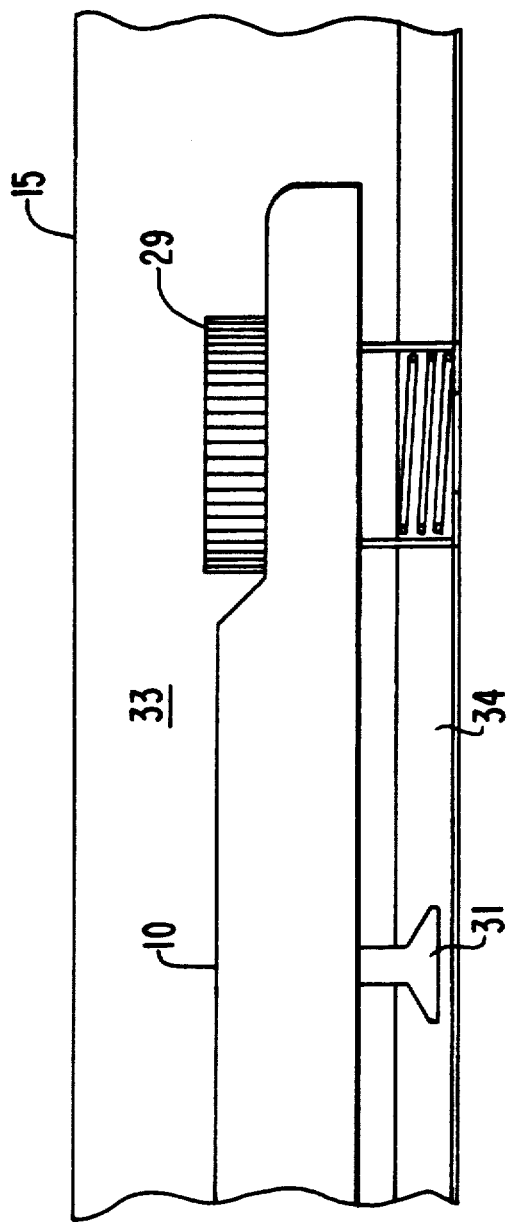
FIG. 9 is a side view illustration of the track with the cargo restraint unit secured thereto.

In the illustrated embodiment shown in FIG. 1, the system of the present invention includes a plurality of cargo restraint units 10, each of which is secured in the track 33 by the combined operation of two tension studs 31, which provide vertical restraint, and two shear plungers 29, which provide fore and aft restraint as shown in FIGS. 8 and 9. The tension studs 31 are standard aircraft hardware items attached to the bottom of the cargo restraint unit 10 at specified intervals and which fit into the hollowed or slotted grooves 34 of the tracks 33. The tracks 33 contain circular openings 35 which are typically drilled at one inch intervals and through which the tension studs 31 can pass for installation of the cargo restraint units 10 and conventional cargo restraints 30. The shear plungers 29 on the cargo restraint units 10 are also standard aircraft hardware items. The shear plungers 29 incorporate a one-quarter turn cam action spring-loaded design to engage the circular holes 35 in the track 33. While each of the two tension studs 31 and shear plungers 29 on the restraint is separated from its respective partner by multiples of one inch, the cadence between the shear plungers 29 and the tension studs 31 differs by one-half inch. Therefore, when the tension studs 31 are engaging the track lips 36 between the circular holes 35, and thereby providing vertical restraint, the shear plungers 29 are held in the circular holes 35 by spring action, thereby providing fore and aft restraint. This portion of the new system does not differ, nor was it intended to differ, from existing cargo hardware designs currently in use, since it must mate with existing aircraft seat tracks 33 for installation.

At least two pairs of opposed cargo restraint units 10 are secured opposite to each other so that a ULD can be positioned between the pair of pawl members 13. As also shown in FIG. 1, the system of the present invention includes at least one elongated locking bar 22 which, as explained below, slidably engages the pawl members 13 of two or more cargo restraint units 10 to hold the ULD in place.

As shown throughout the various figures of the drawings, the housing 11 of the cargo restraint unit 10 is essentially rectangular in shape with a rectangular depression 12 cut into its center. The depression 12 extends from the center of the housing 11 to a lateral edge. In effect, the housing 11 with the depression 12 forms a box having a bottom and three vertically extending sides. The two sides which parallel one another along the longitudinal length of the housing 11 are side members 16. The third side which is perpendicular to the side members 16 and which lies between the side members 16 is the first restraint member 17.

A portion of the housing 11 to the rear of the first restraint member 17 extends away from the depression and tapers essentially to a rounded point. One of the shear plungers 29 is located within the region of the housing 11 which extends from the first restraint member 17. Also contained within that region, on the bottom of the housing 11, is one of the tension studs 31.

The housing 11 may be constructed from any material which can provide the tensile strength necessary to maintain an adequate grip on the ULD placed adjacent thereto. Typically, this material is a high strength aluminum alloy, usually of the 7075 series. Alternatively, the pawl member 13, which is subjected to wear from ULD impact and sliding abrasion, may be constructed from a high strength corrosion-resistant (stainless) steel alloy, usually of the 17-4PH type (17% chromium, 4% nickel, 79% steel, precipitation hardenable by heat treating) or equivalent, although any suitable material can be easily substituted as may be understood by one skilled in the art.

As best shown in FIGS. 1 and 7, each cargo restraint unit 10 has a housing 11 with a depression 12 in which a pawl member 13 and a locking member 14 lie in a substantially horizontal position when in the rest or retracted state. Both the pawl member 13 and the locking member 14 are pivotally attached to the housing. When retracted, the pawl member 13 and the locking member 14 lie below the surface of the transport plane. Therefore, when retracted, the pawl member 13 and the locking member 14 lie below the surface of the cargo floor 15 or at least below the top most portion of the balls of a ballmat (shown in FIG. 1) or the rollers of a roller track (not shown) which may be the principle components of the cargo floor 15.

The pawl member 13 is pivotally attached to the housing 11 between the two side members 16. In the preferred embodiment, a first restraint member 17 is attached to the housing 11 within the depression 12 just forward of the pawl member 13 and provides a first restraining surface. The first restraining surface of first restraint member 17 may be attached, for example, by screws 18 to the housing 11. This allows shims (not shown) to be inserted between the first restraint member 17 and the housing 11. If necessary, shims may be used for initial adjustment of the restraint member 17 to assure the pawl member 13 is in the true vertical position or to eventually compensate for in-service wear of the faces of the restraint member 17 or the pawl member 13. The first restraining surface of first restraint member 17 supports the pawl member 13 after it has been pivoted to a substantially vertical position from the horizontal, retracted position. If desired, the restraining surface can be designed as an integral part of the housing 11.

The pawl member 13, when in its substantially horizontal state, lies in a pawl depression 19 formed in the housing 11. The pawl depression 19 is designed to allow the pivot axis of the pawl member 13 to be placed at a slightly lower horizontal plane than that of the pivot axis of the locking member 14 (described in more detail below). For this reason, the locking member 14 can provide greater support to the pawl member 13 when the pawl member 13 is in the substantially vertical position, because the locking member 14 supports the pawl member 13 at a point slightly higher than the pivot axis of the pawl member 13. This relationship is shown in FIG. 7.

The pawl member 13, at the end opposite to that pivotally attached to the side member 16, includes two grooves 20. As shown in FIG. 7, in the preferred embodiment, a pair of opposing grooves 20 are formed in the two long sides of the pawl member 13. As explained in more detail below, the locking bar 22 fits within these grooves 20 and engages the pawl member 13 when the pawl member 13 is in a substantially vertical position.

The locking member 14 is shown as a "U"-shaped member pivotally attached to the side members 16. The locking member 14 is composed of a "U"-shaped member having a unitary construction wherein the two sides of the "U" are legs 21 which are pivotally attached to the side members 16. The locking member 14 may be constructed from 7075 high strength aluminum alloy or its equivalent. The locking member 14 includes a restraint surface 25 disposed between the legs 21. The two legs 21 and the restraint surface 25 form the "U" shape of the locking member 14. The locking member 14 provides support for the pawl member 13 when pivoted to the substantially vertical, second position and prevents the pawl member 13 from returning to its substantially horizontal rest position.

Figure 2:
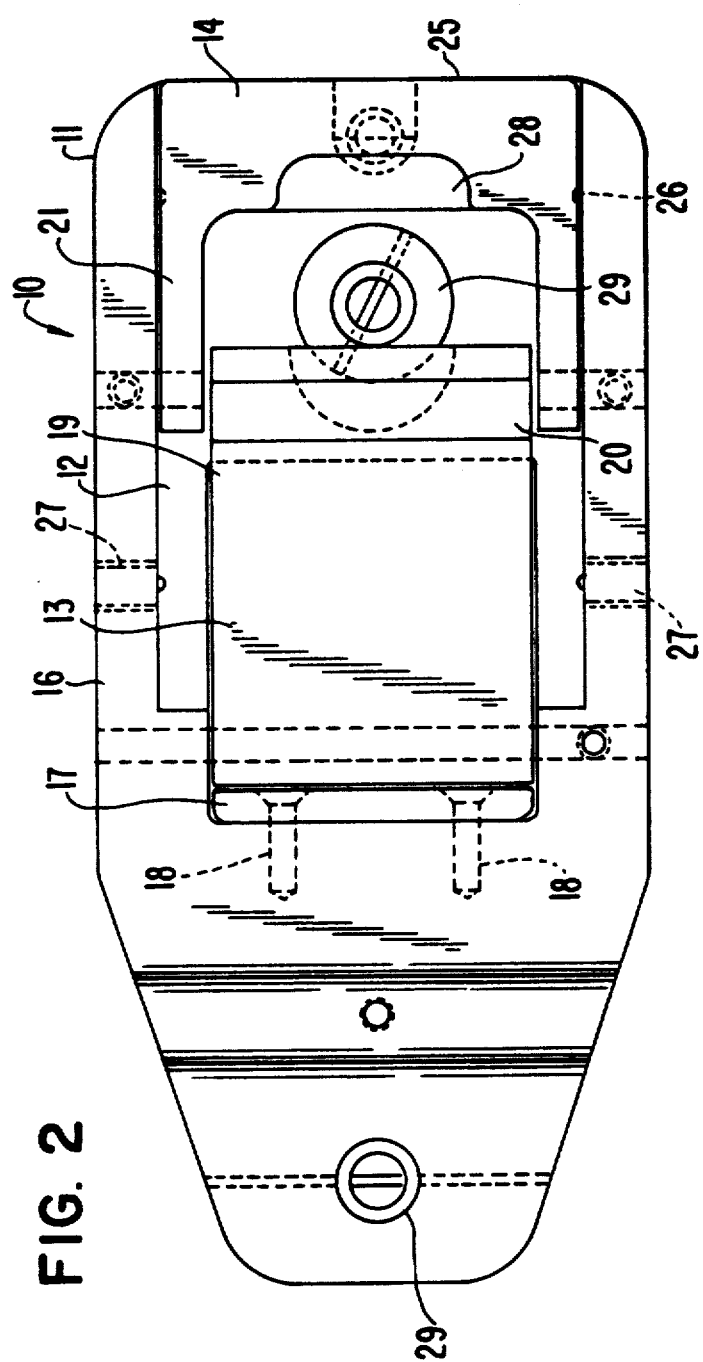
FIG. 2 is a plan view showing both visible and hidden features of a cargo restraint unit of the present invention.
Figure 3:
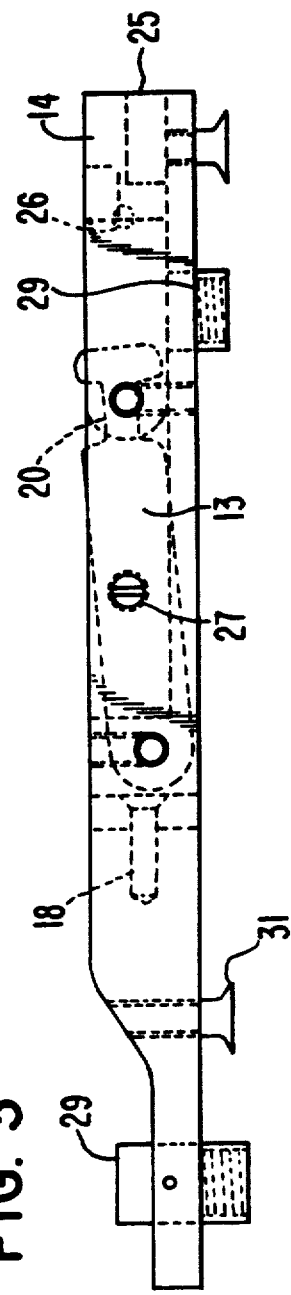
FIG. 3 is a side view of the cargo restraint unit of FIG. 1.

The legs 21 of the locking member 14 may be provided with dimples 26 which can engage spring plungers 27 when the locking member 14 has been rotated to its second horizontal position to support the pawl member 13. As shown in FIG. 2, the spring plungers 27 are permanently secured to the housing 11 since they are disposed through and attached to the side members 16. The spring plungers 27 lock the locking member 14 in its second horizontal position to prevent the locking member 14 from rotating upward during negative g (gravity) inflight conditions.

The restraint surface 25 is provided with finger depressions 28 The finger depressions 28 facilitate pivotal movement of the locking member 14 by an operator in that the finger depressions 28 provide room for the operator's fingers so that he may lift the locking member 14 from either horizontal position.

The housing 11 is provided with shear plungers 29 and tension studs 31 which are used to fix the cargo restraint unit 10 to the cargo floor 15. The cargo restraint unit 10 removably attaches to the cargo floor 15 at the tracks 33 in the cargo floor 15 as previously described and as shown in FIGS. 8 and 9.

The locking bar 22 includes a track 23 in its interior for engaging the pawl member 13 at the end with grooves 20, and it also includes a vertical movement restraint surface 32 which restrains the vertical motion of the ULD. The locking bar 22 may include a handle 24 attached to its topmost portion to simplify removal of the locking bar 22 from the pawl member 13.

As depicted in FIG. 1, the cargo restraint units 10 are affixed to the cargo floor 15 such that three cargo restraint units 10 lie in the same port to starboard (of the freighter aircraft) line. The cargo restraint units 10 must be positioned such that each of their respective pawl members 13, when vertically positioned, lie along the same port to starboard line. Three pawl member units 10 are placed on each of the two locations fore and aft of the 3L position.

The operation of the cargo restraint 10 is described below. After the fuselage of the freighter aircraft has been filled with ULD's, and only the 3-Left position just inside the cargo door remains, the pawl members 13 are moved to the substantially vertical position. The locking member 14 is pivoted from its first horizontal position to the second horizontal position. When in the second horizontal position, the locking member 14 sandwiches the pawl member 13 between the restraint surface 25 and the first restraint 17. Thus, the pawl member 13 is prevented from returning to the horizontal position. The spring plungers 27 lock the locking member 14 in the second horizontal position.

An ULD is then loaded onto the aircraft into the 3L position. As mentioned, the placement of the ULD onto the aircraft cargo floor 15 often shifts the deck angle of the cargo floor 15 to make placement of the ULD difficult. However, with the present invention, the placement of the ULD is greatly simplified because the vertical movement restraint 32 of the pawl member 13 is not yet positioned. Once the ULD is in place, the locking bar 22 is then manually positioned by an operator on the pawl members 13 to secure the ULD in both the 3L aircraft position and the adjacent positions.

In the preferred embodiment of the present invention, six cargo restraint units 10 are arranged in two groups of three each at the fore and aft locations of the 3L cargo position. Conventional restraints 30 are used in the remaining locations. Although the system of the present invention could be applied to all cargo positions, the design is primarily intended for use in the cargo door area where the locking bars 22 must be installed from outside the aircraft (i.e., from the deck of an adjacent cargo loader). A single locking bar 22 connects the three pawl members 13 together to restrain the cargo in the 3L and adjacent positions. Since the locking bar 22 can be completely removed from the pawl members 13, the ULD cannot become wedged in the 3L position under the vertical movement restraints 32 as the ULD is placed into or removed from the fuselage. As a result, the 3L position can be loaded or unloaded very quickly.

The locking bar 22 slides into place on all three pawl members 13. In its simplest construction, an operator must manually place the locking bar 22 on the pawl members 13 by first sliding the locking bar 22 onto the pawl member 13 closest to the cargo door and then pushing the locking bar 22 successively onto the remaining pawl members 13. Since the locking bar 22 has two vertical movement restraint surfaces 32, one on either sides of the pawl member 13, the locking bar 22 also restrains the ULD which abuts the pawl members 13 in the 2L and 4L positions as shown in FIG. 1.

Figure 10:
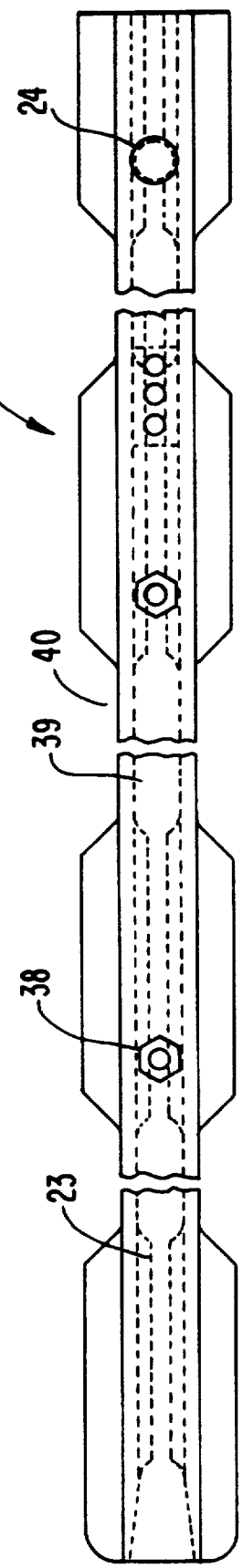
FIG. 10 is a top view of the locking bar.
Figure 11:
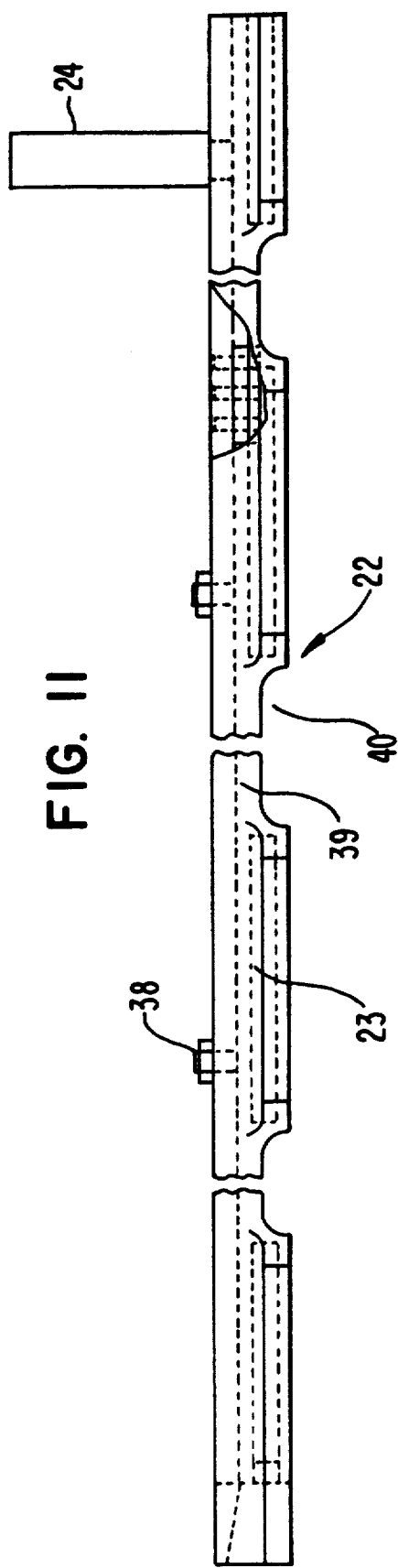
FIG. 11 is a side view of the locking bar.

However, as FIGS. 10 and 11 depict, there is a design of the locking bar 22 which simplifies the placement of the locking bar 22 on the pawl members 13. The locking bar may be provided with track alignment areas 39 and vertical restraint indentations 40. The track alignment areas 39 allow the operator to place the locking bar 22 onto the pawl members 13 such that the top of each pawl member 13 is inserted into a track alignment area 39. Therefore, with a minimum of horizontal motion, the locking bar will engage the pawl members 13 to provide vertical restraint of the ULDs.

The locking bar 22 may be provided with spring plungers 38 which prevent horizontal movement of the locking bar 22 during flight. Without the spring plungers 38, inflight vibrations could cause the locking bar 22 to move a few inches, thereby moving the track alignment areas 39 to the pawl members 13 and disengaging the locking bar 22 from the pawl members 13. Alternatively, inflight vibrations could cause the locking bar 22 to jam against the cargo door which could pose problems on opening that door. Even with the spring plungers 38 included, little more than a firm push or pull is required to manually lock or unlock the locking bar 22.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cargo restraint system for securely holding a cargo pallet or container on a cargo floor comprising:
    a plurality of cargo restraint units including means for attaching each cargo restraint unit to the cargo floor, each cargo restraint unit having a pawl member, which has a substantially flat first position and a substantially upright second position at which the pawl member provides horizontal restrain and permits relative vertical movement of the cargo pallet or container placed adjacent the pawl member; and
    at least one elongated locking bar including means for slidably engaging a predetermined number of extended pawl members to restrict relative vertical motion between the pawl members and the locking bar, the locking bar containing a surface for restraining the vertical movement of the cargo pallet or container when the cargo pallet or container is positioned adjacent the pawl members.

2. The cargo restraint of claim 1, wherein:
    six cargo restraint units are disposed in two groups of three cargo restraints each; and
    two locking bars each connects three cargo restraint units together to restrain cargo positioned between the two groups of three cargo restraints each.

3. The cargo restraint system of claim 1, wherein the plurality of cargo restraint units each comprises:
    a frame having at least a pair of side members;
    the pawl member, having first and second sides, pivotally disposed between the pair of side members and movable about a pivot axis from the first position to the second position;

a first restraining surface on the frame for supporting the first side of the pawl member when the pawl member is pivoted to the second position;

and a locking member having a second restraining surface for selectively locking the pawl member in the second position by supporting the pawl member at the second side.

4. The cargo restraint system of claim 3, wherein the locking member is pivotally attached to the frame and pivots from a first substantially flat nonlocking position to a second substantially flat locking position at which the pawl member is rigidly held in the second position between the first restraining surface and the second restraining surface.

5. The cargo restraint system of claim 4, wherein:
each pawl member includes a pair of opposed longitudinal recesses, one each in the first and second sides of the pawl member; and
the locking bar includes at least a pair of opposed projections which slidably fit within the pair of opposed longitudinal recesses.

6. The cargo restraint system of claim 3, wherein the first and second sides of the pawl member are substantially flat for permitting a cargo pallet or container to be dropped immediately adjacent thereto.

7. The cargo restraint system of claim 3, wherein the locking member is U-shaped and is sized to allow the pawl member to lay substantially flat when the pawl member is in the first position.

8. A cargo restraint system for a 3-Left cargo position on an aircraft comprising:
a plurality of cargo restraint units each having an erectable pawl member; and
at least one locking bar with means for slidably engaging a predetermined number of cargo restraint units and connecting together the predetermined number of cargo restraint units for restraining cargo placed adjacent thereto;
wherein each of the plurality of cargo restraint units includes a housing having a base and a plurality of side members extending vertically therefrom, a pawl member, having first and second sides, pivotally engaging the housing between two of the plurality of side members and being movable about a pivotal axis from a flat position to a substantially upright position, a first restraining member disposed adjacent tot he pawl member and parallel with the pivotal axis for supporting the pawl member in the vertical position at the first side of the pawl member, and a second restraining member pivotally engaging the housing between two of the plurality of side members for selectively supporting the pawl member in the upright position at the second side of the pawl member.

9. The cargo restraint system according to claim 8, wherein:
six cargo restraint units are disposed in two groups of three cargo restraint units each; and
the at least one locking bar connects three of the cargo restraint units together to restrain the cargo adjacent thereto.

10. An apparatus for restraining cargo comprising:
a housing having a base and a plurality of side members extending vertically therefrom;
a pawl member, having first and second sides, pivotally disposed within the housing between two of the plurality of side members and movable about a pivotal axis from a horizontal position to a substantially upright position;
a first restraining member disposed adjacent to the pawl member and parallel with the pivotal axis for supporting the pawl member in the upright position at the first side of the pawl member;
a second restraining member pivotally disposed within the housing between two of the plurality of side members for selectively supporting the pawl member in the upright position at the second side of the pawl member; and
a locking bar with means for slidably engaging the pawl member in a direction parallel with the pivotal axis for restraining cargo placed adjacent thereto.

11. The apparatus of claim 10, wherein the second restraining member is movable from a first horizontal position to a second horizontal position for engaging the second side of the pawl member and for restraining movement of the pawl member.

12. The apparatus of claim 11, further comprising means locking the second restraining member in the second horizontal position.

13. The apparatus of claim 12, wherein the locking means comprises two spring plungers, one disposed each in a side member for releasable engagement with the second restraining member.

14. The apparatus of claim 10, wherein the locking bar comprises:
an elongate slotted bar having a guide track disposed therein for slidable engagement with the pawl members; and
at least one spring plunger disposed in the elongate slotted bar to bias the elongate slotted bar from sliding off the pawl members.

15. The apparatus of claim 14, wherein the locking bar further comprises at least one track alignment area for aligned engagement with the pawl members prior to slidable engagement with the pawl members.

* * * * *

UNITED STATES PATENT AND TRADEMARK OFFICE
CERTIFICATE OF CORRECTION

PATENT NO. : 5,310,297
DATED : May 10, 1994
INVENTOR(S) : ARTHUR J. BENJAMIN

It is certified that error appears in the above-indentified patent and that said Letters Patent is hereby corrected as shown below:

In claim 1, col. 8, line 47, delete "restrain" and insert therefore --restraint--.

Signed and Sealed this

Ninth Day of August, 1994

Attest:

BRUCE LEHMAN

Attesting Officer

Commissioner of Patents and Trademarks